United States Patent [19]

Yamasaki et al.

[11] Patent Number: 4,714,719
[45] Date of Patent: Dec. 22, 1987

[54] CATALYST FOR PREPARATION OF POLYURETHANE AND PROCESS FOR THE PREPARATION

[75] Inventors: Harumasa Yamasaki, Wakayama; Masayoshi Morii, Naga; Yukinaga Yokota, Sennan; Akira Mamada; Yoshiyuki Nabata, both of Wakayama, all of Japan

[73] Assignee: Kao Corporation, Tokyo, Japan

[21] Appl. No.: 927,287

[22] Filed: Nov. 4, 1986

[30] Foreign Application Priority Data

Nov. 13, 1985 [JP] Japan ................................ 60-254085
Nov. 13, 1985 [JP] Japan ................................ 60-254087

[51] Int. Cl.$^4$ ............................................ C08G 18/18
[52] U.S. Cl. .................................. 521/163; 521/115; 521/118; 521/164; 528/49
[58] Field of Search ............... 521/115, 118, 163, 164; 528/49

[56] References Cited

U.S. PATENT DOCUMENTS 4,438,235  3/1984  Brizgys ................................ 528/49

Primary Examiner—Maurice J. Welsh
Attorney, Agent, or Firm—Flynn, Thiel, Boutell & Tanis

[57] ABSTRACT

A polyurethane is prepared with use of a catalyst comprising a compound having the formula:

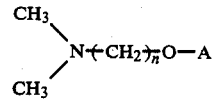

in which n is an integer of 2 to 12, A is a hydrogen or a group of —CH$_2$CHRCH$_2$NH$_2$ and R is hdyrogen or methyl, provided that n is 6 when A is hydrogen. The compound scarcely smells and does not elute out of the polyurethane article. The process is easy to control.

7 Claims, No Drawings

CATALYST FOR PREPARATION OF POLYURETHANE AND PROCESS FOR THE PREPARATION

The invention relates to a process for preparing a polyurethane and in particular a catalyst to use in the preparation of polyurethanes such as flexible, rigid and semi-rigid polyurethanes and elastomers thereof. More particularly, the invention relates to a new catalyst used in the preparation of polyurethanes, which has an ether bond and a primary amino group in the molecule and only an extremely weak smell and which does not migrate in the polyurethane resin.

For the preparation of polyurethanes, metal catalysts based on, for example, tin, iron, titanium or manganese, or amine catalysts have been used and it is known that tertiary amines are preferably used as the catalysts in the preparation of polyurethanes. For example, amines such as N-methylmorpholine, N-ethylmorpholine, triethylenediamine (1,4-diazabicyclo[2.2.2]octane), N,N,N',N'-tetramethyl-1,6-hexanediamine, N,N,N',N',N"-pentamethyldiethylenetriamine, N,N-dimethylcyclohexylamine and N,N-dimethylethanolamine have been used in the preparation of polyurethane. Though N,N-dimethylbenzylamine has been known as a tertiary amine catalyst having an activity nearly equal to that of a morpholine catalyst, the operation is difficult when this compound is used, since it is insoluble in water.

Among these catalysts used in the preparation of polyurethanes, those having a relatively low activity (weak catalysts) include N-methylmorpholine, N-ethylmorpholine and N,N-dimethylbenzylamine. These weak catalysts play a quite important role to control the polyurethane preparation process delicately.

However, the weak catalysts for the preparation of polyurethanes heretofore proposed have many problems. That is, N-methylmorpholine and N-ethylmorpholine have an extremely strong irritating smell and, when they are used in the preparation of polyurethane, the obtained polyurethane also has an irritating smell because the boiling points of N-methylmorpholine and N-ethylmorpholine are low. When such a compound is used in the preparation of the polyurethane, the catalyst remaining in the obtained product migrates into a substance in contact with the polyurethane (for example, a PVC coating formed on the polyurethane) to cause yellowing and to damage the commercial value of the product. N,N-dimethylbenzylamine is defective in that it has a strong irritating smell and, when it is used in the preparation of polyurethane, the obtained polyurethane requires a long curing time in the molding step before it is released from a mold and, therefore, the productivity is reduced disadvantageously. Though the urethane catalyst is used in the form of an aqueous amine solution usually in the preparation of a polyurethane foam, it is difficult to use N,N-dimethylbenzylamine in the form of an aqueous amine solution and, therefore, the workability is reduced seriously, since it has only a low solubility in water.

Catalysts for the preparation of polyurethane resins which do not migrate in the polyurethane resins include those of the following general formula:

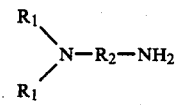

wherein $R_1$ represents an independent alkyl group having 1 to 6 carbon atoms or the two $R_1$ groups may form a 3- to 6-membered heterocyclic ring with the nitrogen atom and $R_2$ represents a divalent organic group having no active group reactive with an isocyanate other than the amino group, as disclosed in the specification of Japanese Patent Laid-Open No. 4846/1971. Compounds used as the catalyst in the preparation of polyurethanes in the examples given in said specification include dimethylaminopropylamine, diethylaminopropylamine and N-(2-aminoethyl)aziridine.

However, these compounds have problems with respect to working atmosphere, since they have a low boiling point due to their small molecular weight and an extremely strong irritating smell.

SUMMARY OF THE INVENTION

The invention provides a catalyst for preparation of a polyurethane, which comprises a compound having the formula:

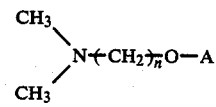

in which n is an integer of 2 to 12, A is hydrogen or a group of —CH2CHRCH2NH2 and R is hydrogen or methyl, provided that n is 6 when A is hydrogen.

The compound for the catalyst of the invention includes two embodiments. One embodiment has the formula in which A is said group. The other has the formula in which A is hydrogen.

Further the invention provides a process for preparing a polyurethane from a polyol and a polyisocyanate in the presence of a catalyst comprising a compound having the formula:

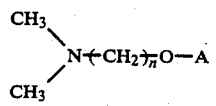

in which n is an integer of 2 to 12, A is hydrogen or a group of —CH2CHRCH2NH2 and R is hydrogen or methyl, provided that n is 6 when A is hydrogen.

The invention will be below explained in detail first in reference to the first embodiment of the catalyst compound. Then it will be disclosed also about the second embodiment.

After intensive investigations made for the purpose of solving the above-mentioned problems, the inventors have found that compounds having an ether bond and a primary amino group in the molecule have an extremely weak smell and an activity suitable as the catalyst for the preparation of polyurethanes and that, after the preparation of the polyurethane, these compounds do not migrate in said resin. The present invention has been completed on the basis of this finding.

The present invention provides a catalyst for the preparation of polyurethanes which comprises a compound of the general formula:

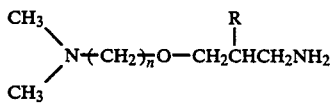

wherein
n represents an integer of 2 to 12 and
R represents a hydrogen atom or a methyl group.

The new catalyst of the present invention for the preparation of polyurethanes can be prepared easily by reacting an N,N-dimethylaminoalkanol having 2 to 12 carbon atoms in the alkanol moiety with acrylonitrile or methacrylonitrile to form a compound of the general formula:

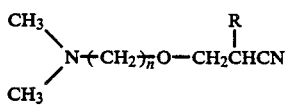

wherein n and R are as defined above, and then converting the CN group into a $CH_2NH_2$ group by catalytic hydrogenation.

The new catalyst of the present invention is used in an amount in the range of preferably 0.01 to 10 parts (by weight; the same shall apply hereinafter), particularly 0.1 to 4 parts, for 100 parts of a polyol used in the preparation of the polyurethane. It is also possible, however, to use the catalyst in an amount beyond said range for the purpose of realizing an optimum condition for the preparation of polyurethane by controlling the amount of the catalyst. The novel catalyst of the present invention can be used in combination with a tertiary amine such as triethylenediamine or an organometallic compound such as an organotin compound used usually as a cocatalyst in the preparation of polyurethanes.

The polyisocyanate usable as the starting material for the polyurethanes in the presence of the new catalyst of the present invention may be any of known polyisocyanates such as 2,4-tolylene, 2,6-tolylene, 4,4'-diphenylmethane, hexamethylene, isophorone, lysine, xylylene, cyclohexane, toluidine, p-phenylene, o-phenylene, m-phenylene, 1,5-naphthylene, 4,4'-biphenyl, 3,3'-dimethylbiphenyl 4,4'-, and 3,3'-dimethoxybiphenyl 4,4'-diisocyanates.

The polyols usable in the preparation of the polyurethane in the presence of the new catalyst of the present invention include known polyester polyols and polyether polyols. Examples of them include polyester polyols prepared from an ordinary dibasic acid and a polyhydric alcohol; polyether polyols obtained by adding ethylene oxide or propylene oxide to a polyhydric alcohol such as glycol, glycerol, pentaerythritol, trimethylolpropane or sucrose; and amine polyols obtained by adding ethylene oxide or propylene oxide to a polyamine such as triethylenediamine, tolylenediamine, 1,6-hexanediamine, 1,3-propionediamine or isophoronediamine. Organic polyol reactants usable in the preparation of the polyurethane foams include polymer polyols. They are prepared by polymerizing one or more ethylenically unsaturated monomers dissolved or dispersed in any of other polyols mentioned herein in the presence of a free radical catalyst. The ethylenically unsaturated monomers may be used either alone or in the form of a mixture of them and typical examples of them include ethylene, propylene, acrylonitrile, vinyl chloride, vinylidene chloride, styrene, α-methylstyrene, methyl methacrylate and butadiene. Such a composition can be prepared usually by polymerizing the monomer in the polyol as the base in the presence of a free radical initiator comprising a peroxide, persulfate, percarbonate, perborate or azo compound at a temperature in the range of about 40° to 150° C.

In the preparation of the polyurethanes in the presence of the new catalyst of the present invention, additives may be used, if necessary. The additives include, for example, foaming agents such as $CFCl_3$ and $CH_2Cl_2$, surfactants such as organopolysiloxanes, and flame retardants such as alkyl halides and phosphorus halides. The varieties and amounts of these additives may be the same as those used usually.

The above relates to the first embodiment of the compound for the catalyst of the invention. Instead the second embodiment shown below may be used in the same way as shown above in the invention.

After intensive investigations made for the purpose of solving the above-mentioned problems, the inventors have found that compounds having dimethylamino and primary hydroxyl groups in the molecule have an extremely weak smell and properties suitable as the catalyst for the preparation of polyurethanes. The present invention has been completed on the basis of this finding.

The present invention provides a catalyst for the preparation of polyurethanes which comprises a compound of the formula:

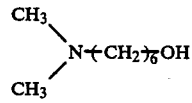

The catalyst of the invention to use for preparation of a polyurethane is obtained, for example, by reacting hexanediol with dimethylamine. Alternatively it is prepared easily by reacting 1-chloro-6-hydroxyhexane with dimethylamine.

The new catalyst of the present invention for the preparation of polyurethanes has an extremely weak smell supposedly because its molecular weight is larger and its boiling point is higher than those of known catalysts. With the catalyst of the present invention having a $(CH_3)_2N$-group in the molecule, an activity suitable as the catalyst for the preparation of polyurethanes and the number of nitrogen atoms per molecular weight larger than that of known catalysts, the operation of the preparation of polyurethane can be controlled easily. Further the primary amino or hydroxy group of the compound reacts with the isocyanato group in the starting material of the polyurethane and is incorporated in the polyurethane molecule before the completion of the polyurethane-forming reaction. Therefore, no migration of the catalyst on the surface of the product is observed after completion of the curing and, accordingly, troubles due to the migration (such as yellowing and insufficient adhesion) can be avoided.

The catalyst of the invention reacts with an isocyanate group in the process for preparation of a polyurethane to be incorporated chemically with resulting polyurethane molecules before the completion of the reaction. As a result, the catalyst does not migrate onto the resin surface. Thus, this catalyst for the preparation of polyurethanes is a non-migrating catalyst. This catalyst has only an extremely weak smell. It has a catalytic activity higher than those of N-methylmorpholine, N-ethylmorpholine and N,N-dimethylbenzylamine and, therefore, it has an economical advantage in that the amount thereof may be reduced. Tertiary amine urethane catalysts have been used in the form of an aqueous amine solution in the conventional processes for the preparation of polyurethanes. The new catalyst of the present invention for the preparation of polyurethane is highly soluble in water and, therefore, causes no trouble in the conventional processes for the preparation of polyurethanes.

Now, the detailed description will be made on the non-migrating property of the catalyst. When a monolithic molding is prepared from a polyurethane foam and a vinyl chloride sheet in the presence of, a known catalyst such as N,N-dimethylbenzylamine (DMBA), the amine migrates from the polyurethane foam into the vinyl chloride sheet after completion of the foaming and curing and the vinyl chloride sheet is yellowed gradually disadvantageously. This phenomenon is accelerated by heating or other means and this is a serious problem in the automobile industry wherein a lot of moldings of this type are used. However, when the catalyst of the present invention for the preparation of polyurethane is used, the catalyst does not migrate from the polyurethane foam so that said problems can be solved.

Further, the catalyst of the present invention for the preparation of polyurethanes has a quite low volatility and, therefore, only a weak smell, since it has a relatively high molecular weight and a high boiling point. With this catalyst, the working environment in the preparation of polyurethanes can be improved remarkably.

The following examples and comparative examples will further illustrate the present invention, which by no means limit the invention.

EXAMPLES 1 TO 4 AND COMPARATIVE EXAMPLES 1 TO 5

A polyurethane foam was prepared from starting materials used in amounts shown in Table 1 by an ordinary process. More particularly, a polyol, water, surfactant, catalyst, foaming agent and polyisocyanate were mixed together by stirring and the mixture was poured into a paper cup kept at 20° C. to form a urethane foam. In this step, the paper cup was not covered.

The results are shown in Tables 2 to 9. In the tables, the cream time means a time from the initiation of the mixing and stirring of the starting materials to just before the initiation of the foaming. The gel time is a time required for the sufficient polymerization until stringiness of the polyurethane foam is observed when a sharp-edged substance is brought into contact with the surface of the polyurethane foam and then taken out. The tack-free time means a time required until the polyurethane foam no more adheres to a finger when the finger touches it. The rise time means a time required until the apparent maximum height of the polyurethane foam is obtained.

TABLE 1

| Component | Parts by weight |
| --- | --- |
| 454AR*[1] | 70.0 |
| SBU-0478*[2] | 20.0 |
| MN-700*[3] | 10.0 |
| Water | 1.5 |
| L-5340*[4] | 1.5 |
| Freon-11 | 40.0 |
| Tertiary amine urethane catalyst | varied as shown in Tables 2 to 9 |
| Isocyanate TR-50BX*[5] | index 105 |

*[1] An aromatic amine polyol (OHV:450) (a product of Asahi Olin)
*[2] A sugar polyether polyol (OHV:530) (a product of Sumitomo Bayer Urethane)
*[3] A glycerol polyether polyol (OHV:235) (a product of Mitsui Toatsu Urethane)
*[4] A surfactant of Nippon Unicar
*[5] An isocyanate of Mitsui Toatsu Urethane (a mixture of crude MDI with TDI prepolymer; NCO: 31%).

TABLE 2

Cases in which N,N—dimethylaminohexyl 3-aminopropyl ether was used as the catalyst (substantially no irritating smell recognized)

| Example 1 | Amount (parts) | | | |
| --- | --- | --- | --- | --- |
| | 2.0 | 4.0 | 6.0 | 8.0 |
| Cream time (sec) | 16 | 10 | 8 | 6 |
| Gel time (sec) | 120 | 71 | 50 | 33 |
| Tack-free time (sec) | 180 | 91 | 60 | 45 |
| Rise time (sec) | 204 | 122 | 88 | 65 |

TABLE 3

Cases in which N,N—dimethylaminoethyl 3-aminopropyl ether was used as the catalyst (substantially no irritating smell recognized)

| Example 2 | Amount (parts) | | | |
| --- | --- | --- | --- | --- |
| | 2.0 | 4.0 | 6.0 | 8.0 |
| Cream time (sec) | 13 | 7 | 6 | 4 |
| Gel time (sec) | 119 | 72 | 52 | 32 |
| Tack-free time (sec) | 181 | 90 | 60 | 42 |
| Rise time (sec) | 200 | 123 | 85 | 66 |

TABLE 4

Cases in which N,N—dimethylaminohexyl 2-methyl-3-aminopropyl ether was used as the catalyst (substantially no irritating smell recognized)

| Example 3 | Amount (parts) | | | |
| --- | --- | --- | --- | --- |
| | 2.0 | 4.0 | 6.0 | 8.0 |
| Cream time (sec) | 14 | 9 | 6 | 5 |
| Gel time (sec) | 115 | 64 | 42 | 32 |
| Tack-free time (sec) | 170 | 98 | 54 | 42 |
| Rise time (sec) | 194 | 114 | 84 | 60 |

TABLE 5

Cases in which N,N—dimethylaminoethyl 2-methyl-3-aminopropyl ether was used as the catalyst (substantially no irritating smell recognized)

| Example 4 | Amount (parts) | | | |
| --- | --- | --- | --- | --- |
| | 2.0 | 4.0 | 6.0 | 8.0 |
| Cream time (sec) | 13 | 8 | 6 | 5 |
| Gel time (sec) | 118 | 69 | 44 | 36 |
| Tack-free time (sec) | 176 | 102 | 56 | 44 |
| Rise time (sec) | 199 | 120 | 88 | 62 |

TABLE 6

Cases in which N,N—dimethylbenzylamine was used as the catalyst (a strong irritating smell recognized)

| Comparative Example 1 | Amount (parts) | |
| --- | --- | --- |
| | 7.5 | 10.0 |
| Cream time (sec) | 13 | 8 |
| Gel time (sec) | 91 | 80 |
| Tack-free time (sec) | 140 | 100 |

TABLE 6-continued

| Cases in which N,N—dimethylbenzylamine was used as the catalyst (a strong irritating smell recognized) | | |
|---|---|---|
| Comparative | Amount (parts) | |
| Example 1 | 7.5 | 10.0 |
| Rise time (sec) | 160 | 130 |

When the values similar to those obtained by using the catalysts of the present invention are to be obtained by using N,N-dimethylbenzylamine, the amount of this catalyst must be increased to an economically disadvantageous amount.

TABLE 7

| Cases in which N—methylmorpholine N—ethylmorpholine was used as the catalyst (a strong irritating smell recognized) | | |
|---|---|---|
| Comparative Examples 2 and 3 | N—methylmorpholine 10 parts | N—ethylmorpholine 10 parts |
| Cream time (sec) | 11 | 16 |
| Gel time (sec) | 100 | 150 |
| Tack-free time (sec) | 160 | 250 |
| Rise time (sec) | 160 | 230 |

When the values similar to those obtained by using the catalysts of the present invention are to be obtained by using N-methylmorpholine or N-ethylmorpholine, the amount of this catalyst must be increased to an economically disadvantageous amount.

TABLE 8

| Cases in which dimethylaminopropylamine was used as the catalyst (an irritating smell recognized) | | |
|---|---|---|
| Comparative | Amount (parts) | |
| Example 4 | 2.0 | 4.0 |
| Cream time (sec) | 15 | 9 |
| Gel time (sec) | 59 | 34 |
| Tack-free time (sec) | 99 | 52 |
| Rise time (sec) | 135 | 80 |

It is known that when the human body is stained with dimethylaminopropylamine, it is poisoned with this compound to cause a rash or the like.

TABLE 9

| Cases in which N—(2-aminoethyl)aziridine was used as the catalyst (an irritating smell recognized) | | |
|---|---|---|
| Comparative | Amount (parts) | |
| Example 5 | 2.0 | 4.0 |
| Cream time (sec) | 9 | 5 |
| Gel time (sec) | 73 | 44 |
| Tack-free time (sec) | 115 | 63 |
| Rise time (sec) | 195 | 121 |

EXAMPLE 5 AND COMPARATIVE EXAMPLE 6

A polyurethane foam was prepared from starting materials used in amounts shown in Table 10 by an ordinary process. More particularly, a polyol, water, catalyst and polyisocyanate were mixed together by stirring and the mixture was poured into a paper cup to form a urethane foam. In this step, the paper cup was not covered. The amount of the catalyst used was controlled so that the rise time would be 50±5 sec.

The vinyl chloride sheet used was prepared by kneading the components shown in Table 11 and pressing the mixture to obtain a sheet.

Samples weighing about 3 g were cut out of the obtained polyurethane foam, placed in an about 130-cm³ sample bottle together with a vinyl chloride sheet having an area of 16 cm² and left to stand in a constant temperature bath at 110° C. for 24 h. After cooling to room temperature, the degree of yellowing of the vinyl chloride sheet was determined by measuring the yellow index. The results are shown in Table 12.

TABLE 10

| Component | Parts by weight |
|---|---|
| Excenol-840*1 | 100 |
| E-17*2 | 8.0 |
| MN-300*3 | 8.0 |
| Water | 2.2 |
| SBU 44 V 20*4 | Index 105 |
| Catalyst for the*5 preparation of polyurethane | |

*1A glycerol polyether polyol (molecular weight: about 6500, OHV: 26) (a product of Asahi Olin)
*2A dimer acid polyester (OHV: 360) (a product of Kao Co., Ltd.)
*3A polyether polyol (a product of Mitsui Toatsu Urethane)
*4Crude MDI (a product of Sumitomo Bayer Urethane)
*5Controlled so that the rise time would be 50 ± 5 sec.

TABLE 11

| Component | Parts by weight |
|---|---|
| Polyvinyl chloride | 100 |
| Dioctyl phthalate | 50 |
| Stabilizer | 2.5 |
| Heavy calcium carbonate | 10 |

TABLE 12

| | Y.I. |
|---|---|
| Catalyst of Example 1 | 53.1 |
| Catalyst of Example 2 | 54.7 |
| Catalyst of Example 3 | 52.9 |
| Catalyst of Example 4 | 54.8 |
| Catalyst of Comparative Example 1 | The sample sheet was blackened. |
| Catalyst of Comparative Example 2 | 135.1 |
| Catalyst of Comparative Example 3 | 162.1 |
| Catalyst of Comparative Example 4 | 90.1 |
| Catalyst of Comparative Example 5 | 92.3 |

EXAMPLE 6

The smells of the catalysts of the present invention and the comparative catalysts were examined. Test method for checking the amine catalysts for the smell:

An amine urethane catalyst was dissolved in MN-700 (a glycerol-based polyether polyol having a molecular weight of about 700; a product of Mitsui Toatsu Co., Ltd.) to obtain a solution of a given concentration. The smell of the solution was examined by 50 selected smell panelists. The results are shown in Table 13. The degree of the smell was divided into the following groups:

⊚: substantially no smell
○: faint smell
△: smell
X: strong smell

TABLE 13

| | Amine catalyst (%) | | | | |
|---|---|---|---|---|---|
| | 10 | 5 | 1 | 0.5 | 0.1 |
| Product of the present invention | | | | | |
| N,N—Dimethylaminohexyl 3-aminopropyl ether | ○ | ○ | ○~⊚ | ⊚ | ⊚ |
| N,N—Dimethylaminoethyl 3-aminopropyl ether | ○ | ○ | ○ | ⊚ | ⊚ |

TABLE 13-continued

|  | Amine catalyst (%) | | | | |
|---|---|---|---|---|---|
|  | 10 | 5 | 1 | 0.5 | 0.1 |
| N,N—Dimethylaminohexyl 2-methyl-3-aminopropyl ether | ◯ | ◯ | ◉ | ◉ | ◉ |
| N,N—Dimethylaminoethyl 2-methyl-3-aminopropyl ether | ◯ | ◯ | ◯~◉ | ◉ | ◉ |
| Comparative product | | | | | |
| N,N—Dimethylbenzylamine | X | X | X~Δ | Δ | ◯ |
| N—Methylmorpholine | X | X | X | Δ | Δ |
| N—Ethylmorpholine | X | X | X~Δ | Δ | Δ |
| Dimethylaminopropylamine | X | X | Δ | Δ | ◯ |
| Dimethylaminoethylamine | X | X | X~Δ | Δ | ◯ |
| N—(2-Aminoethyl)aziridine | X | X | Δ | Δ | ◯ |

The amount of the catalyst added is usually less than 10% (preferably 3 to 5%). It is apparent from the above table that the new catalyst of the present invention for the preparation of polyurethane has such an extremely weak smell.

EXAMPLE 7 AND COMPARATIVE EXAMPLES 7 AND 8

A polyurethane foam was prepared from starting materials used in amounts shown in Table 14 by an ordinary process. More particularly, a polyol, water, surfactant, catalyst, foaming agent and polyisocyanate were mixed together by stirring and the mixture was poured in a paper cup kept at 20° C. to form a urethane foam. In this step, the paper cup was not covered.

The properties of the catalyst of the present invention and ordinary catalysts for the preparation of the polyurethanes were examined and the results are shown in Tables 15 to 17. In the tables the cream time means a time from the initiation of the mixing and stirring of the starting materials to just before the initiation of the foaming. The gel time is a time required for the sufficient polymerization until stringiness of the polyurethane foam is observed when a sharp-edged substance is brought into contact with the surface of the polyurethane foam and then taken out. The tack-free time means a time required until the polyurethane foam no more adheres to a finger when the finger touches it. The rise time means a time required until the apparent maximum height of the polyurethane foam is obtained.

TABLE 14

| Component | Parts by weight |
|---|---|
| 454AR*[1] | 70.0 |
| SBU-0478*[2] | 20.0 |
| MN-700*[3] | 10.0 |
| Water | 1.5 |
| L-5340*[4] | 1.5 |
| Freon-11 | 40.0 |
| Tertiary amine urethane catalyst | varied as shown in Tables 15 to 17 |
| Isocyanate TR-50BX*[5] | index 105 |

*[1]An aromatic amine polyol (OHV:450) (a product of Asahi Olin)
*[2]A sugar polyether polyol (OHV:530) (a product of Sumitomo Bayer Urethane)
*[3]A glycerol polyether polyol (OHV:235) (a product of Mitsui Toatsu Urethane)
*[4]A surfactant of Nippon Unicar
*[5]An isocyanate of Mitsui Toatsu Urethane (a mixture of crude MDI with TDI prepolymer; NCO: 31%).

TABLE 15

Cases in which the catalyst of the present invention for the preparation of polyurethane was used (no irritating smell recognized)

|  | Amount (parts) | | | |
|---|---|---|---|---|
| Example 7 | 2.0 | 3.0 | 4.0 | 5.0 |
| Cream time (sec) | 13 | 10 | 8 | 7 |
| Gel time (sec) | 95 | 73 | 57 | 43 |
| Tack-free time (sec) | 117 | 95 | 71 | 58 |
| Rise time (sec) | 163 | 124 | 104 | 80 |

TABLE 16

Cases in which dimethylaminoethanol was used as the catalyst (an extremely strong bad recognized)

|  | Amount (parts) | | | |
|---|---|---|---|---|
| Comparative Example 7 | 2.0 | 3.0 | 4.0 | 5.0 |
| Cream time (sec) | 10 | 7 | 5 | 4 |
| Gel time (sec) | 110 | 83 | 61 | 50 |
| Tack-free time (sec) | 160 | 114 | 77 | 63 |
| Rise time (sec) | 195 | 148 | 120 | 93 |

TABLE 17

Cases in which $(CH_3)_2N{-}(CH_2CH_2O)_3H$ was used as the catalyst

|  | Amount (parts) | | | |
|---|---|---|---|---|
| Comparative Example 8 | 2.0 | 4.0 | 6.0 | 8.0 |
| Cream time (sec) | 12 | 8 | 7 | 5 |
| Gel time (sec) | 150 | 100 | 75 | 57 |
| Tack-free time (sec) | 250 | 140 | 95 | 72 |
| Rise time (sec) | 280 | 170 | 133 | 107 |

EXAMPLE 8

The gelation caused when the catalyst for the preparation of polyurethane was mixed with water in the presence of a silicone surfactant was examined by the following method to obtain the results shown in Table 18.

Method 62 g of water, 56 g of a silicone surfactant and 16 g of a catalyst were stirred together by means of a miniature motor and the gelation of the mixture was examined.

TABLE 18

|  | Gelation |
|---|---|
| Catalyst of the present invention | not gelled |
| Comparative catalyst | |
| Dimethylethanolamine | gelled |
| $(CH_3)_2N{-}(CH_2CH_2O)_2H$ | gelled |
| $(CH_3)_2N{-}(CH_2CH_2O)_3H$ | gelled |

EXAMPLE 9

The smells of the catalysts of the present invention and the comparative catalysts for the preparation of polyurethanes were examined. The results are shown in Table 19.

Test method for checking the amine catalysts for the smell

An amine urethane catalyst was dissolved in MN-700 (a glycerol-based polyetherpolyol having a molecular weight of about 700; a product of Mitsui Toatsu Co., Ltd.) to obtain a solution of a given concentration. The smell of the solution was examined by 50 selected smell panelists. The degree of the smell was divided into the following groups:

⊚ : substantially no smell
○ : faint smell
Δ: smell
x: strong smell

TABLE 19

| | Amine catalyst (%) | | | | |
|---|---|---|---|---|---|
| | 10 | 5 | 1 | 0.5 | 0.1 |
| Dimethylaminohexanol | O | O | ⊚ | ⊚ | ⊚ |
| N,N—Dimethylbenzylamine | X | X | X~Δ | Δ | O |
| N—Methylmorpholine | X | X | X | Δ | Δ |
| N—Ethylmorpholine | X | X | X~Δ | Δ | Δ |
| Dimethylaminoethanol | X | X | Δ | Δ | Δ |

What is claimed is:

1. A process for preparing a polyurethane which comprises reacting a polyol and a polyisocyanate in the presence of a catalyst comprising a compound having the formula:

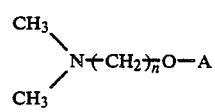

in which n is an integer of 2 to 12, A is $CH_2CHRCH_2NH_2$ and R is hydrogen or methyl.

2. A process as claimed in claim 1, in which 0.01 to 10 parts by weight of said compound is used per 100 parts by weight of the polyol.

3. A process as claimed in claim 1, in which the reaction is effected further in the presence of a tertiary amine polyurethane-forming co-catalyst and/or an organic tin compound polyurethane forming co-catalyst.

4. A process as claimed in claim 1, in which n is 2.

5. A process as claimed in claim 1, in which n is 6.

6. A process as claimed in claim 4, in which R is methyl.

7. A process as claimed in claim 5, in which R is methyl.

* * * * *